2,887,399

AQUEOUS COATING COMPOSITIONS OF COAL ACIDS AND STARCH AND A BASE COATED THEREWITH

Herbert B. Rickert, Midland, Mich., assignor to The Dow Chemical Company, Midland, Mich., a corporation of Delaware No Drawing. Application February 27, 1957
Serial No. 642,683

8 Claims. (Cl. 106—213)

This invention relates to aqueous coal acids and starch coating compositions and to articles or substrates coated therewith. It also relates to articles or substrates which have been protectively coated with a coal acids-starch coating to afford scratch resistant and non-polar organic solvent resistant properties to various articles of manufacture, which coatings can be removed readily if desired.

Many temporary protective coatings are known. The majority of those presently in use lack one or more desirable physical properties, present difficulties in their removal or are relatively expensive.

In accordance with this invention, it has now been discovered that coal acids-starch coatings can be deposited as films upon various substrates to provide relatively inexpensive protection against light marring and affording nonpolar organic solvent resistance. Because of their water-solubility, such films are removable by washing with water. The coal acids-starch coatings used in this invention are applied as aqueous compositions containing between 2 and 75 percent by weight of binder solids. The coal acids are present in true solution and the starch is present in colloidal or gelatinized form. The proportions of coal acids and starch, solids basis, can be varied widely between 10 and 90 percent by weight of coal acids and correspondingly between 90 and 10 percent of starch. The solids content of such aqueous coating compositions is also widely variable. For instance, when a mixture of 90 percent by weight of coal acids and 10 percent starch is used, a solids content as high as 75 percent by weight can be attained, the balance being water, while when a mixture of 10 percent coal acids and 90 percent starch is used, a maximum solids content of 30 percent can be attained. The preferred maximum solids content with a 90 percent coal acids-10 percent starch mixture is 65 percent, while the preferred maximum solids content with a 10 percent coal acids-90 percent starch mixture is about 25 percent. By "a starch" or "the starch," as used in this specification, is meant a gelatinized starch of the group including neutral starches, i.e., potato, wheat, and corn starch, oxidized starch and dextrinized starch, commonly called dextrin, inter alia.

In practice, the aqueous coal acids-starch coating compositions can be prepared by a pre-mix or a post-mix process. In the pre-mix process, the starch is gelatinized in the presence of a coal acids solution by heating a starch-coal acids-water mixture for a conventional time-temperature schedule sufficient to gelatinize the starch. In the post-mix process, a pre-gelled starch, preferably as an aqueous dispersion, is mixed with an aqueous coal acids solution.

The coal acids-starch coating compositions can be applied in usual ways, i.e., by brushing, spraying, casting or dipping, depending upon the consistency of the coating composition. The coatings are applied to substrates which are not affected harmfully by water or coal acids, i.e., glass, plastics, aluminum, etc., or upon porous substrates, particularly of cellulosic materials, when their viscosity is sufficient to give a surface film. They are dried by evaporating water, advantageously at room temperature or thereabout. The coal acids-starch coatings are most useful at relative humidities between about 15 and 85 percent. At such humidities, the small amount of water retained, between about 1 and 10 percent by weight, improves film flexibility.

The coal acids that are useful in the compositions of this invention are identical with or similar to those which are obtained by the oxidation with gaseous oxygen or air of an aqueous alkaline slurry of a finely divided carbonaceous material selected from the group consisting of coal or coke that has been obtained by the carbonization of coal at temperatures below about 700° C. Coal acids that have been obtained by the nitric acid oxidation of suitable carbonaceous materials are also satisfactory. Such coal varieties as anthracite, bituminous, sub-bituminous, lignite or low-grade coals are suitable for the production of coal acids. Satisfactory cokes are those produced according to conventional techniques from coal at a temperature below about 700° F. The utilization of higher coking temperatures frequently causes the cokes that are obtained to be graphitic and rendered unsuitable for conversion to coal acids in satisfactory yields.

The preparation of coal acids from coal may, by way of illustration, involve mixing a ground bituminous coal with a caustic alkali, such as sodium hydroxide, and water, using an excess of the caustic with respect to the amount that is contemplated as being required for neutralizing the coal acids formed. Generally, an apparatus is employed that is constructed from a corrosion-resisting material of construction and that is adapted for operation under pressure. The apparatus is also equipped with an efficient mixing or agitating mechanism and with suitable heat-exchanging means. The weight ratio of the charged ingredients, may for example, be in the proportion of about 3 parts by weight of the coal to 9 parts by weight of the caustic alkali to 125 parts by weight of water. Oxygen is bubbled through the agitated charged ingredients while they are maintained at a temperature between about 200° and 300° C. and under a pressure of from about 500 to 1200 pounds per square inch. The exothermic reaction is continued until substantially all of the carbonaceous ingredients of the coal have gone into solution. This usually requires a period of time between 2 and 3 hours. In the oxidation reaction that occurs, about half of the carbon in the coal is converted to organic acid compounds, while the remainder is oxidized to carbon dioxide. Upon termination of the reaction and cooling of the reaction mass, the coal ash is filtered out of the alkaline solution that is obtained.

The coal acids may then be isolated by acidifying the solution with a mineral acid, e.g., sulfuric acid and, after filteration, recovering the free, water-soluble coal acids by extraction with a suitable solvent, such as methyl ethyl ketone, which does not dissolve in water in appreciable amounts in the presence of such salts as sodium sulfate which are obtained in the acidified free coal acid solution. Known evaporation and drying techniques are employed for subsequently isolating the free coal acids. The coal acids may thus be prepared as solid materials that are often pulverized for subsequent handling in a powder form.

The free coal acids product is a hydroscopic, usually yellowish, essentially water-soluble material, believed to be comprised substantially of various aromatic polycarboxylic acids. The average molecular weight of the coal acids that are ordinarily obtained is usually in the neighborhood of 250. Their average equivalent weight is generally about 80. They ordinarily appear to have an average of 2.5 to 5 carboxylic groups per molecule, with an apparent average of about 3 to 4 being common. They evidently contain considerable quantities of tri- and tetra-carboxylic benzene acids as well as aromatic acids having more complex nuclei. Frequently, for example, the predominant proportion of aromatic nuclei in coal acids prepared in the described fashion have been found to consist of methylnaphthalene, benzene, biphenyl, naphthalene, phenanthrene, alkylbenzene, benzophenone and toluene nuclei.

The following examples show ways in which the invention has been practiced.

EXAMPLE 1

The following formulation was mixed together and boiled for 10 minutes:

| | G. |
|---|---|
| Coal acids, 50 percent aqueous solution | 10 |
| Potato starch | 5 |
| Water | 40 |

The resulting coating composition had a Gardner viscosity of A. It was cast on three different glass plates, dried at room temperature, conditioned under varying humidity conditions for 24 hours and evaluated as indicated in the following table.

*Table I*

| Rel. Humidity, percent | Thickness, Mils. | Clarity | Adhesion | State |
|---|---|---|---|---|
| 76 | 1 | good | good | hard, non-tacky, smooth. |
| 51 | 2 | ...do... | fair | Do. |
| 20 | 1 | ...do... | good | Do. |

EXAMPLE 2

A quantity of 10 g. of potato starch was mixed with 130 g. of water and boiled for 20 minutes. Ten g. of the resulting starch dispersion was mixed with 30 g. of a 50 percent by weight coal acids solution in water to give a formulation suitable for use as a protective coating composition.

EXAMPLE 3

A quantity of 2 g. of wheat starch was boiled for 10 minutes with 36 g. of a 50 percent by weight aqueous coal acids solution. The resulting coating composition was used to coat three sheets of polystyrene, and the films were dried at room temperature. The conditioned films were evaluated as indicated in the following table.

*Table II*

| Rel. Humidity, percent | Thickness, Mils. | Clarity | Adhesion | State |
|---|---|---|---|---|
| 76 | 2 | clear | poor | soft, tacky. |
| 51 | 2 | ...do... | fair | hard, non-tacky. |
| 20 | 2 | ...do... | very good | Do. |

All of the coatings were completely removable by water-washing to leave an unchanged, clear, plastic surface.

EXAMPLE 4

A quantity of 4 g. of a 50 percent by weight aqueous coal acids solution, 18 g. of corn starch and 150 ml. of water was boiled for 10 minutes to give a coating composition which was cast on three aluminum strips. The coatings were conditioned at varying humidities and evaluated as indicated in the following table.

*Table III*

| Rel. Humidity, percent | Thickness, Mils. | Clarity | Adhesion | State |
|---|---|---|---|---|
| 76 | 2 | clear | fair | soft, flexible. |
| 51 | 1 | ...do... | poor | hard, brittle. |
| 20 | 1 | ...do... | ...do... | Do. |

EXAMPLE 5

A coating composition was made by boiling together for 10 minutes 6 g. of potato starch, 10 g. of water and 28 g. of a 50 percent by weight aqueous coal acids solution. The coating compositions were used to cast films on the bottom of 5 Petri dishes. The films were dried at 20 percent relative humidity. The dishes were then filled seriatim with the following solvents: methylene chloride, xylene, carbon tetra-chloride, mineral spirits (B.R. 150–200° C.) and toluene. None of the films was attacked by the solvents.

EXAMPLE 6

A coating composition was made by boiling together 10 g. of wheat starch, 20 g. of water and 10 g. of coal acids. The bottom of a 90 mm. Petri dish was coated with this composition and inoculated with 1 ml. of a suspension containing the 5 fungi *Aspergillus terreus*, *Aspergillus niger*, *Rhizopus nigricans*, *Penicillium chrysogenuns* and *Candida pelliculosa*. After 30 days' exposure at 30° C. and 85 percent relative humidity, the inoculated sample showed no sign of fungal attack. A control of gelatinized wheat starch under the same conditions showed fungal attack within 5 days.

EXAMPLE 7

A coating composition was made by boiling together for 20 minutes 0.4 g. of a 50 percent by weight aqueous coal acids solution, 1.8 g. of potato starch, and 97.8 g. of water. The cooled coating composition was cast on a glass plate. When dried at room temperature and 30 percent relative humidity, the 1 mil film obtained was clear and non-tacky.

What is claimed is:

1. An aqueous coating composition consisting of between 2 and 75 percent by weight of a mixture of coal acids and starch, said ingredients being in proportions ranging between 10 and 90 percent by weight of the coal acids and between 90 and 10 percent by weight of the starch, the starch being in gelatinized form, the balance being water.

2. The composition of claim 1 wherein the starch is corn starch.

3. The composition of claim 1 wherein the starch is wheat starch.

4. The composition of claim 1 wherein the starch is potato starch.

5. A base having a coating the film forming binder of which consists of a mixture of between 10 and 90 percent by weight of coal acids and correspondingly between 90 and 10 percent by weight of a starch, the starch being in gelatinized form.

6. The product of claim 5 wherein the base is glass.

7. The product of claim 5 wherein the base is plastic.

8. The product of claim 5 wherein the base is aluminum.

References Cited in the file of this patent

UNITED STATES PATENTS

| 60,626 | Gibson | Dec. 18, 1866 |
| 1,369,708 | Roberts | Feb. 22, 1921 |
| 2,271,724 | Traylor | Feb. 3, 1942 |
| 2,435,901 | Peters | Feb. 10, 1948 |